United States Patent
Gallagher, Jr. et al.

(10) Patent No.: US 9,027,309 B2
(45) Date of Patent: May 12, 2015

(54) WELDED HOT-ROLLED HIGH-STRENGTH STEEL STRUCTURAL MEMBERS AND METHODS

(75) Inventors: Hugh M. Gallagher, Jr., Cincinnati, OH (US); Joseph Bryan Loosle, Providence, UT (US); Jack L. Williams, Deweyville, UT (US); William W. Wood, North Logan, UT (US); Brenda D. Daniels, Malad, ID (US); Cory J. Anthony, Brigham City, UT (US); David R. Smith, Huntsville, UT (US)

(73) Assignees: Consolidated Metal Products, Inc., Cincinnati, OH (US); Nucor Corporation, Charlotte, NC (US)

(*) Notice: Subject to any disclaimer, the term of this patent is extended or adjusted under 35 U.S.C. 154(b) by 20 days.

(21) Appl. No.: 13/346,218

(22) Filed: Jan. 9, 2012

(65) Prior Publication Data

US 2013/0174512 A1    Jul. 11, 2013

(51) Int. Cl.
| | |
|---|---|
| *E04C 3/07* | (2006.01) |
| *B23K 9/18* | (2006.01) |
| *B23K 31/02* | (2006.01) |
| *B62D 21/18* | (2006.01) |
| *C21D 7/13* | (2006.01) |
| *C22C 38/04* | (2006.01) |
| *C22C 38/12* | (2006.01) |
| *C22C 38/14* | (2006.01) |
| *B21B 1/09* | (2006.01) |

(52) U.S. Cl.
CPC . *B23K 31/02* (2013.01); *B21B 1/09* (2013.01); *B23K 9/18* (2013.01); *B23K 2201/28* (2013.01); *B23K 2203/04* (2013.01); *B62D 21/18* (2013.01); *C21D 7/13* (2013.01); *C22C 38/04* (2013.01); *C22C 38/12* (2013.01); *C22C 38/14* (2013.01)

(58) Field of Classification Search
CPC .......... B30B 9/32; B23P 17/04; B21D 47/01; E04C 3/04; E04B 1/20; E04B 5/00; E04B 5/10; E04B 5/17; E04B 1/54; E04B 2001/2448; E04B 2001/2454
USPC ......... 52/831, 836, 842, 846, 481.1; 148/320; 420/103, 120, 126, 127; 280/795–800, 280/781; 29/897, 897.3, 897.31, 897.32, 29/897.33, 897.34, 897.35, 897.1, 897.2, 29/897.312, 525.14
See application file for complete search history.

(56) References Cited

U.S. PATENT DOCUMENTS

| | | | | |
|---|---|---|---|---|
| 3,050,831 A | * | 8/1962 | Diamond | 29/897.31 |
| 3,197,610 A | * | 7/1965 | Litzka | 219/124.21 |
| 3,217,659 A | * | 11/1965 | Ford, Jr. | 104/109 |
| 3,283,464 A | * | 11/1966 | Litzka | 52/636 |
| 3,698,224 A | * | 10/1972 | Saytes | 72/178 |

(Continued)

OTHER PUBLICATIONS

U.S. Appl. No. 13/243,352, Applicant Hugh M. Gallagher, Jr. filed Sep. 23, 2011.

*Primary Examiner* — Beth Stephan
(74) *Attorney, Agent, or Firm* — Wood, Herron & Evans, LLP (57) ABSTRACT

Hot-rolled high-strength steel elongated structural members and method of making same are disclosed by hot-rolling high-strength steel having a specific chemical composition to provide structural units. The units are then welded together to provide structural members of desired geometrical configuration including a thin web with opposed thicker flanges extending therefrom to increase the load bearing capacity of the members.

12 Claims, 3 Drawing Sheets

(56) References Cited

U.S. PATENT DOCUMENTS

| | | | |
|---|---|---|---|
| 3,874,051 A * | 4/1975 | Malik | 29/897.31 |
| 4,894,898 A * | 1/1990 | Walker | 29/897.35 |
| 4,896,818 A * | 1/1990 | Shteinbok et al. | 228/170 |
| 5,100,613 A * | 3/1992 | Bodnar et al. | 420/120 |
| 5,191,778 A | 3/1993 | Inagaki et al. | |
| 5,524,410 A * | 6/1996 | Menchetti | 52/838 |
| 5,553,437 A * | 9/1996 | Navon | 52/837 |
| 5,669,197 A * | 9/1997 | Bodnar | 52/636 |
| 5,704,998 A | 1/1998 | Gallagher, Jr. | |
| 5,823,042 A * | 10/1998 | Snyder et al. | 72/366.2 |
| 5,956,919 A * | 9/1999 | McCracken | 52/840 |
| 6,012,256 A * | 1/2000 | Aschheim | 52/167.1 |
| 6,055,788 A * | 5/2000 | Martin et al. | 296/204 |
| 6,131,362 A * | 10/2000 | Buecker | 52/842 |
| 6,256,958 B1 * | 7/2001 | Matthews | 52/489.2 |
| 6,286,868 B1 | 9/2001 | von Mayenburg | |
| 6,450,394 B1 * | 9/2002 | Wollaston et al. | 228/112.1 |
| 6,591,576 B1 * | 7/2003 | Iida et al. | 52/843 |
| 6,910,616 B2 * | 6/2005 | Halley et al. | 228/112.1 |
| 6,923,482 B2 * | 8/2005 | Cumming et al. | 293/102 |
| 6,948,749 B2 * | 9/2005 | Graber | 293/102 |
| 7,182,393 B2 * | 2/2007 | Guiles | 296/146.6 |
| 7,797,908 B2 * | 9/2010 | Keys | 52/846 |
| 8,028,493 B2 * | 10/2011 | Holmes et al. | 52/837 |
| 8,176,710 B2 * | 5/2012 | Davidson et al. | 52/856 |
| 2005/0210820 A1 * | 9/2005 | Tanaka et al. | 52/730.6 |
| 2008/0028720 A1 * | 2/2008 | Bartlett et al. | 52/726.2 |
| 2009/0100794 A1 * | 4/2009 | Holmes et al. | 52/831 |
| 2010/0126097 A1 * | 5/2010 | Powers, III | 52/481.1 |
| 2011/0162320 A1 * | 7/2011 | Bartlett et al. | 52/843 |

\* cited by examiner

WELDED HOT-ROLLED HIGH-STRENGTH STEEL STRUCTURAL MEMBERS AND METHODS

FIELD OF THE INVENTION

The present invention relates to welded hot-rolled high-strength steel structural members and a method of making them. More particularly, the welded hot-rolled high-strength steel structural members having a desired geometric cross-sectional configuration are suitable for use as truck frame rails having the advantages of significant weight saving with minor or no strength compromise.

BACKGROUND OF THE INVENTION

High-strength structural members have been formed using hot-rolling techniques which are well known in the art. In U.S. Pat. No. 5,704,998, a wide variety of high-strength steel structural members are formed from high-strength steel blanks. This patent discloses the formation of high-strength steel members having a uniform cross-sectional configuration over at least a portion, and often substantially all of its entire length. Structural members having a variety of shapes such as O, L, C, Z, T, I, W, U, or V shapes were formed by hot-forging or rolling. The structural members disclosed have at least one flange included in their cross-sectional configurations which has a thickness less than an overall outer dimension of the cross-sectional configuration and provides increased load-bearing capability to the structural members. According to the method described, the mechanical properties of tensile strength and yield strength of the finished product are substantially the same as or greater than the material used to form the member and the member is produced without further strengthening processing steps. In the example of this patent, a high-strength AISI 1552 steel stock was hot rolled into an I-beam structural member. The I-beam structural member had a cross-sectional configuration having a web portion and opposed flanges extending from the ends of the web portion. The opposed flanges had an average tapered thickness that was essentially the same as the thickness of the web portion.

Structural members having reduced web thicknesses and thicker flanges have also been proposed. However, there is a need for improved structural members that offer weight reductions, cost savings and other advantages without significant reduction in strength.

SUMMARY OF THE INVENTION

This invention is directed to a welded hot-rolled high-strength steel structural member having a set cross-sectional configuration over at least a portion of its length including a web portion with upper and lower flange portions extending from the web portion. The set cross-sectional configuration is generally a uniform cross-section. The web portion has at least one elongated integral weld extending along the length of said member between the upper and lower flange portions. The flange portions with the web portion increase the load bearing capacity of the structural member. The web portion of a structural member has an average thickness less than the average thickness of the lesser thickness of the upper and lower flange portions.

In a preferred form, the web portion has an average thickness generally not less than about 35% and not more than about 85% of the average thickness of the thicknesses of the flanges. A variety of structural members employing the principles of this invention may be made by forming in a hot-rolling process as disclosed herein. Optimal cross-sections of the elongated high-strength steel members provide weight savings and cost reduction with minor or no compromise in strength.

According to this invention, the high-strength structural member is formed by hot-rolling the high-strength steel to provide a first structural unit having a set cross-sectional configuration over at least a portion of its length, including a first flange precursor portion with a first web precursor portion extending from the first flange portion. A second structural unit is hot-rolled having a set cross-sectional configuration including a second flange precursor portion with a second web precursor portion extending from the second flange portion. Thereafter, the first web precursor portion of the first structural unit is welded to the second web precursor portion of the second structural unit to form a welded web portion having at least one elongated integral weld extending along the length of said member between the first and second flange portions.

In a preferred method of this invention, a first high-strength steel structural unit having a set cross-sectional configuration is hot-rolled in elongated form with a first web precursor portion extending generally at about a 90° angle from a first flange precursor portion. Then, a second structural unit having the same set cross-sectional configuration including the web and flange precursor portions is hot-rolled. The web portions of the first and second structural units are then welded at their ends to provide an elongated structural member having a set cross-sectional configuration with first upper and second lower flange portions extending at a 90° angle from opposite ends of the welded web portion. The welded web portion has a thickness less than the average thickness of the lesser thickness of the first upper and second lower flange portions.

The method and resulting structural member of this invention enable greater design flexibility and different assembly combinations in the manufacturing and use of structural members. In particular, the elongated structural member can be hot-rolled to provide a lower flange portion having an average thickness different, i.e., greater or less, than the average thickness of the upper flange portion. In addition, the cross-sectional length of the lower flange portion can be different, i.e., greater or less, than the cross-sectional length of the upper flange portion. Thus, asymmetrical designs with significant reductions in weight and costs can be achieved.

The first structural unit may also be welded to the second structural unit in a variety of ways to make structural members having different cross-sectional configurations. A structural unit may be welded to a second or another structural unit of the same shape by toe-to-toe or butt-welding and other forms of welding the precursor web portions to provide design flexibility. For example, a first structural unit having a first web precursor portion extending from the first flange portion can be butt-welded to form a "C-beam" structural member. Employing the same 90° angle structural units, the butt-welding of the web precursor portions can be used to form a "Z-beam", "T-beam", "I-beam", or a "rectangular beam". The design flexibility of the method and product of this invention will be further described and illustrated in the following Examples.

Structural members having an L, C, Z, T, I, U, or rectangular shape, and other similar members are made by hot rolling a relatively thin web portion on the order of about 35% to about 85% of the average thickness of the thicknesses of the end flange portions to provide significant weight savings. An important feature of this invention is the employment of high-strength structural steel having a tensile strength of at least about 120,000 psi and a yield strength of at least about 90,000 psi. The structural member having a desired geometric configuration is made where the mechanical properties of tensile strength and yield strength of the member are substantially the same as or greater than the steel material employed. The formed structural member is cooled or quenched, preferably at a controlled rate, without changing its configuration by distortion or the like. The method of making high-strength structural steel members by hot-rolling is achieved, in some embodiments, without further strengthening processing steps.

The benefits of the hot-rolled high-strength steel structural members and method include the production of structural members such as truck frame rails. Lower frame rail weights may also be achieved without sacrificing strength. Furthermore, a number of designs including asymmetrical designs are achievable according to the method of this invention. According to certain features of this invention, the design configurations may be optimized for weight reduction, strength improvement, or a combination of both weight reduction and strength improvement. With the greater design and assembly flexibility of the hot-rolled high-strength steel structural members or rails, improved spatial arrangements and combinations of frame rail designs are achievable. The principles of this invention, its objectives and advantages, will be further understood with reference to the following detailed description.

DETAILED DESCRIPTION OF THE INVENTION

The present invention is directed to the production of a structural member which is elongate with a set or generally uniform cross-sectional configuration of at least a portion, and typically a substantial portion of, its length. The structural member includes a web portion with upper and lower opposed flange portions extending from the web portion with the web portion having at least one elongated integral weld extending along the length of the member between the flange portions. Usually the weld will extend along the complete length of the member. However, several or more than one elongated welds can run the length of the member to achieve the strength requirements of the structural member. As described above, the method of making the structural member involves hot-rolling the high-strength steel into first and second units having flange and web precursor portions along their lengths, which extend generally at a 90° angle relative to one another. The two special angle units are then welded longitudinally by toe-to-toe or butt-welding the web precursor portions of each unit to produce a structural member. The welding process can be of a submerged arc type or other welding method sufficient to gain strength and integrity in the welded area commensurate with the strength of the steel in the area of the web adjoining the welded region.

The web portion of the structural member has an average thickness less than the average thickness of the thicknesses of the upper and lower flange portions. In a preferred form, the web average thickness is not less than about 35% and not more than about 85% (or on the order of about 35%-85%) of the average thickness of the thicknesses of the upper and lower flange portions. The high-strength steel material has a tensile strength of at least about 120,000 psi, and a yield strength of at least about 90,000 psi, wherein the high-strength steel comprises, by weight percent:

carbon, about 0.30% to about 0.65%
manganese, about 0.30% to about 2.5%,
at least one of the group consisting of aluminum, niobium, titanium, and vanadium, and mixtures thereof, about 0.03% to
about 0.35%, and
iron and production impurities, the balance.

In a more preferred form, the high-strength steel material has the following composition, by weight percent:

carbon, about 0.40% to about 0.55%
manganese, about 0.30% to about 2.5%
at least 1 of the group consisting of aluminum, niobium, titanium
and vanadium, and mixtures thereof, in an amount up to about
0.20%, and
iron and production impurities, the balance.

Vanadium is the most preferred. Furthermore, it should be understood that the compositions listed and claimed herein may include other elements which do not impact upon the practice of this invention.

In a preferred embodiment, the method of the present invention for making a high-strength steel structural member includes providing high-strength steel material having a tensile strength of at least about 120,000 psi, and preferably at least about 150,000 psi, and a yield strength of at least about 90,000 psi, and preferably at least about 130,000 psi. In one form, the high-strength steel material utilized has been hot reduced to provide a billet or blank having the mechanical properties of tensile strength and yield strength stated above. In another application, the material can be cold drawn to achieve improved physical and dimensional properties. The high strength material used for the formation of the structural member in one form may be processed in molten, softened, or hardened form and in another form may be a billet or blank to be hot rolled according to this invention.

This invention is predicated in part upon the finding that the specified steel structural material may be processed in molten, softened, or hardened form, and in another form, maybe a billet or blank to be hot-rolled according to this invention. A high-strength steel material having a tensile strength of at least about 120,000 psi and a yield strength of at least about 90,000 psi, which is used as the starting material or piece in the method of the present invention, is produced by any suitable method known in the art. Steel material, having a composition of mechanical properties of tensile strength and yield strength as given above, is thereafter hot-rolled, forged, or otherwise formed at a temperature above the re-crystallization temperature, typically about 2,000° F. to provide a structural member having the desired geometric configuration. The temperature at which the structural member is rolled is related to the chemical composition of the steel material used. With the above-described chemical composition, a hot-rolled structural member may have a large martensite content, depending on the cooling rate. The rolled structural member, with the mechanical properties of tensile strength and yield strength given, may be produced, in some embodiments, without further strengthening processing steps subsequent to the hot-rolling or forging thereof. Once the steel of proper composition has been rolled at the proper temperature, the hot-rolled steel may be allowed to cool, preferably at an accelerated and controlled rate, to room temperature from the rolling temperature. Alternatively, the rolled steel may be quenched in oil or water, and then tempered if it has significant martensite content to reduce brittleness in the resulting structural member.

The elongated structural member, having a set cross-sectional configuration over at least a portion of its length, includes the web portion with a first upper and second lower flange portions extending from the web portion. The upper and lower flange portions with the web portion provide increased load-bearing capacity to the structural member. Notwithstanding the web average thickness of about 35% to about 85%, or up to about 85% of the average thickness of the thicknesses of the upper and lower flange portions, it has been found that such a structure offers minor or no compromise in strength as compared to a structure wherein the thicknesses of the web and flanges are essentially the same.

The following Examples illustrate the practice of the present invention to produce a hot-rolled high-strength structural member from a high-strength steel material in accordance with this invention.

Comparative Example 1

Figure 1:
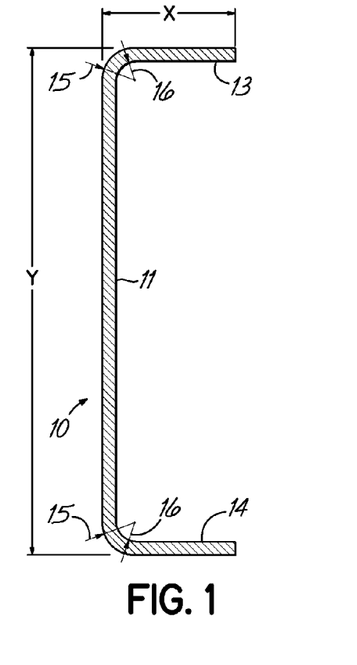
FIG. 1 is a cross-sectional illustration of a known comparative frame rail design.

This Example illustrates a known comparative design of a frame rail 10 for a truck. The baseline frame rail 10 cross-section is shown in FIG. 1. The central web portion 11 and extending flanges 13, 14 have the same thickness of about 6.8 mm (0.268"). The length along the vertical Y axis cross-section of the rail is about 270 mm (10.630") with the length of end flanges 13, 14 approximating 70 mm (2.756") along the horizontal X axis. The corner radii are 16.80 mm (0.661") external 15 and 10 mm (0.394") internal 16 for the structure shown. Accordingly, for comparative purposes, for a rail length of approximately 8,020 mm (316") and a weight of about 167 kgs (371 lbs) with the same thicknesses of the 6.8 mm (0.268") for the webs and flanges, the following moments of inertia calculations are made:

Area=$2.62e+003$ millimeters^2

Centroid relative to output coordinate system origin: (millimeters)
X=−15
Y=135
Z=0
Moments of inertia of the area, at the centroid: (millimeters ^4)
Lxx=2.46e+007 Lxy=2.29e−008 Lxz=0
Lyx=2.29e−008 Lyy=9.96e+005 Lyz=0
Lzx=0 Lzy=0 Lzz=2.56e+007
X is horizontal. Y is vertical.

Example 2

Figure 2:
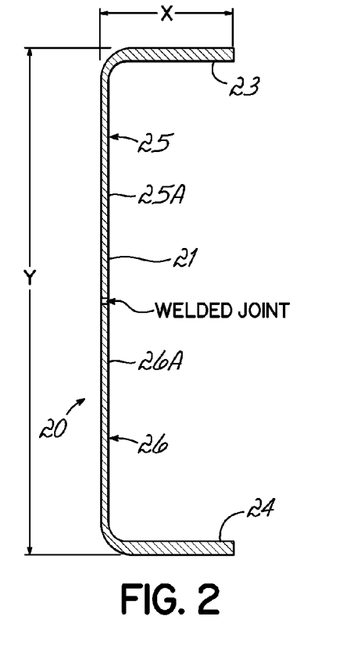
FIG. 2 is a cross-section of a welded hot-rolled high-strength steel structure of this invention.

A hot-rolled high-strength rail structure 20 of this invention is shown in FIG. 2. In the cross-sectional illustration, the structure 20 is made from first and second hot-rolled structural units 25, 26 which are welded together to provide an elongated "Welded Joint" over the structure 20 horizontal length. The first structural unit 25 is includes a first upper flange precursor portion 23 with a first web precursor portion 25A extending at a 90° angle from the first flange portion 23 to form a round corner. A second structural unit 26 having the same set or uniform cross-sectional configuration as the first structural unit 25 is hot-rolled to provide a second lower flange precursor portion 24 with a second web precursor portion 26A extending from the second flange portion 24. The units 25, 26 are welded together by arc welding the first web precursor portion 25A of the first structural unit 25 to the second web precursor portion 26A of the second structural unit 26 to form the Welded Joint of the elongated structural member 20. The resulting structural member 20 thus has a web portion 21 with upper 23 and lower flange portions 24 extending from the opposite ends of the web portion 21. The integral elongated Welded Joint of web portion 21 extends along the length of the member at about a neutral axis between the upper and lower flange portions 23, 24. The web portion 21 has an average thickness less than the average thickness of the thickness of the upper and lower flange portions 23, 24. The web thickness 21 is reduced by 50% from 6.8 mm of FIG. 1 to 3.40 mm (0.134") and the flange portions 23, 24 have thicknesses remaining constant at 6.8 mm (0.268"). This high-strength structural member was formed by hot-rolling the high-strength steel having a tensile strength of at least about 120,000 psi, and a yield strength of at least about 90,000 psi and having the following composition:

carbon, about 0.30% to about 0.65%
manganese, about 0.30% to about 2.5%,
at least one of the group consisting of aluminum, niobium, titanium, and vanadium, and mixtures thereof, about 0.03% to
about 0.35%, and
iron and production impurities, the balance.

The set or uniform cross-sectional configuration of rail 20 over its length has first and second flange portions 23, 24 with a thinner web 21 portion connecting the flange portions. According to this Example, the following calculations are made.

Area=$1.75e+003$ millimeters^2=$1.75 \times 10^3$ mm

Centroid relative to output coordinate system origin: (millimeters)
X=−19.8
Y=135
Z=0
Moments of inertia of the area, at the centroid: (millimeters ^4)
Lxx=1.99e+007 Lxy=0 Lxz=0
Lyx=0 Lyy=9.71e+005 Lyz=0
Lzx=0 Lzy=0 Lzz=2.07e+007
X is horizontal. Y is vertical.

The whole web 21 thickness is reduced to 3.4 mm (0.134") for a weight saving of 33% (55 kgs, 122 lbs) with a strength compromise of only 19%. Strength is defined as the section modulus of the cross section about the horizontal axis through the centroid at its farthest bottom part from the horizontal axis through the centroid. Wherefore, a significant weight saving is achieved with minor strength compromise by comparison of Example 2 to the structure of baseline Comparative Example 1 as shown by the calculation for comparative section modulus (ΔSM):

$$\Delta SM = \frac{2.46 - 1.99}{2.46} \times 100\% = 19\%$$

Example 3

Figure 3:
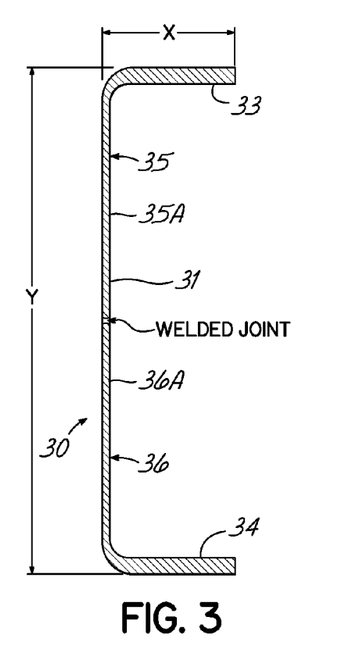
FIG. 3 is an alternate cross-section of a welded hot-rolled high-strength steel structure.

In this Example, another structural member 30 of this invention is shown in FIG. 3 with the same hot-rolled steel properties and composition of Example 2. In this Example, structural member 30 is fabricated in the same fashion as the structural member 20 of Example 2 by hot-rolling the first and second structural units 35, 36, each having web precursor portions 35A and 36A, respectively, extending from first and second flange precursor portions 33 and 34. The first structural unit 35 is welded to the second structural unit 36 to form a welded web portion 31 having an elongated Welded Joint along a substantial portion of the length of the elongated structural member 30 at about a neutral axis between the first and second flange portions 33, 34 opposed and extending from opposite ends of the welded web portion 31. The web portion 31 has an average thickness less than the average thickness of the thicknesses of flange portions 33 and 34. The web thickness of Comparative Example 1 is reduced by 50%, and the first and second flange thicknesses are increased, as shown by FIG. 3. In FIG. 3, the whole web thickness 31 is reduced to 3.4 mm (0.134") and both the first upper 33 and second lower 34 flange thicknesses are increased to 9 mm (0.354"). By comparison with the structure of Example 1, weight savings is 22% (37 kgs, 82 lbs) and there is no strength compromise. Hole patterns can be made in the rail for vehicular frame rail purposes as required. Therefore, the advantages of this structure as shown by FIG. 3 include significant weight savings without strength compromise. Again, strength is defined as the section modulus of the cross section about the horizontal axis through the centroid at its farthest bottom part from the horizontal axis through the centroid, with reference to the following calculations.

Area=2.04$e$+003 millimeters^2

Centroid relative to output coordinate system origin (millimeters)
X=-22.2
Y=135
Z=0
Moments of inertia of the area, at the centroid: (millimeters ^4)
Lxx=2.46e+007 Lxy=5.25e-008 Lxz=0
Lyx=5.25e-008 Lyy=1.05e+006 Lyz=0
Lzx=0 Lzy=0 Lzz=2.56e+007
X is horizontal. Y is vertical.
No strength compromise is shown by the calculation for comparative section modulus (ΔSM):

$$\Delta SM = \frac{2.46 - 2.46}{2.46} \times 100\% = 0\%$$

Example 4

Figure 4:
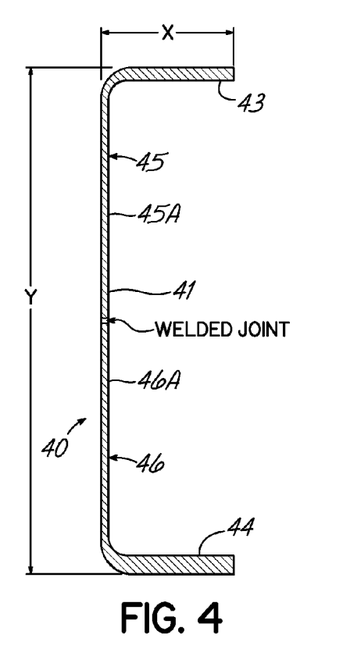
FIG. 4 is an alternate cross-section of a welded hot-rolled high-strength steel structure.

In this Example, another structural member 40 of this invention is shown in FIG. 4 with the same hot rolled steel properties and composition of Example 2. In this Example, structural member 40 is fabricated in the same fashion as the structural member 20 of Example 2 by hot-rolling the first and second structural units 45, 46, each having web precursor portions 45A and 46A, respectively, extending at about a 90° angle from first and second flange precursor portions 43 and 44. The first structural unit 45 is welded to the second structural unit 46 to form a welded web portion 41 having an elongated Welded Joint along the length of the elongated structural member 40 at about the neutral axis between the first and second flange portions 43, 44 opposed and extending from opposite ends of the welded web portion 41. The web portion 41 has an average thickness less than the average thickness of the lesser thickness of flanges 43 and 44. The web thickness of Comparative Example 1 is reduced by 50%, and the lower flange 44 thickness is increased with reference to FIG. 4. In FIG. 4, the whole web 41 thickness is reduced to 3.4 mm (0.134"), and only the lower flange 44 thickness is increased to 9.5 mm (0.374"). This Example illustrates the average thickness of each flange portion can be different, i.e. greater or less than the other flange portion. The weight saving is 26% (43 kg, 96 lbs), and there is no strength compromise with reference to the following calculations:

Area=1.93$e$+003 millimeters^2

Centroid relative to output coordinate system origin: (millimeters)
X=-21.4
Y=123
Z=0
Moments of inertia of the area, at the centroid: (millimeters)
Lxx=2.25e+007 Lxy=-3.5e+005 Lxz=0
Lyx=-3.5e+005 Lyy=9.84e+005 Lyz=0
Lzx=0 Lzy=0 Lzz=2.35e+007
X is horizontal. Y is vertical.
Again, strength is defined as the section modulus of the cross section about the horizontal axis through the centroid at its farthest bottom part from the horizontal axis through the centroid. Wherefore, there is significant weight savings in the structure of this Example without strength compromise as shown by the calculation for comparative section modulus (ΔSM):

$$\Delta SM = \frac{2.46 - \left(2.25 \times \frac{135}{123}\right)}{2.46} \times 100\% = -0.39\%$$

Example 5

Figure 5:
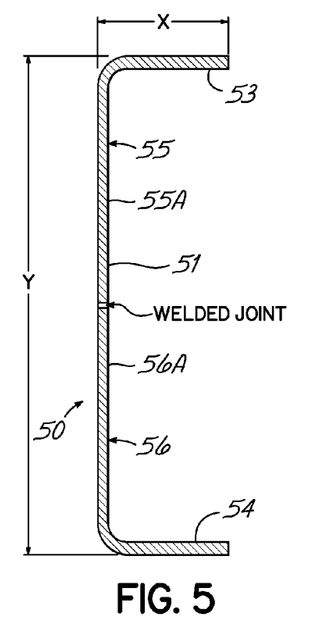
FIG. 5 is an alternate cross-section of a welded hot-rolled high-strength steel structure.

In this Example, another structural member 50 of this invention is shown in FIG. 5 with the same hot-rolled steel properties and composition of Example 2. In this Example, structural member 50 is fabricated in the same fashion as the structural member 20 of Example 2 by hot-rolling the first and second structural units 55, 56, each having web precursor portions 55A and 56A, respectively, extending from first and second flange precursor portions 53 and 54. The first structural unit 55 is welded to the second structural unit 56 to form a welded web portion 51 having an elongated Welded Joint along the length of the of elongated structural member 50 between the first and second flange portions 53, 54 opposed and extending from opposite ends of the welded web portion 51. The web portion 51 has an average thickness less than the average thickness of either thickness of flanges 53 and 54. Upon comparison with Comparative Example 1, and as shown in FIG. 5, the web 51 thickness is reduced by 25% from 6.80 mm to 5.1 mm (0.201") with constant first upper flange 53 and second lower flange 54 thicknesses of 6.80 mm (0.268"). The weight saving is 17% (28 kgs, 62 lbs) with a strength compromise of about 10%. Again, strength is defined as the section modulus of the cross section about the horizontal axis through the centroid at its farthest bottom part from the horizontal axis through the centroid, according to the following calculations:

Area=2.18e+003 millimeters^2

Centroid relative to output coordinate system origin: (millimeters)
X=−16.7
Y=135
Z=0
Moments of inertia of the area, at the centroid: (millimeters ^4)
Lxx=2.22e+007 Lxy=4.66e−008 Lxz=0
Lzx=0 Lzy=0 Lzz=2.32e+007
X is horizontal. Y is vertical.
Strength compromise of 10% is shown by the calculation for comparative section modulus (ΔSM):

$$\Delta SM = \frac{2.46 - 2.22}{2.46} \times 100\% = 10\%$$

Example 6

Figure 6:
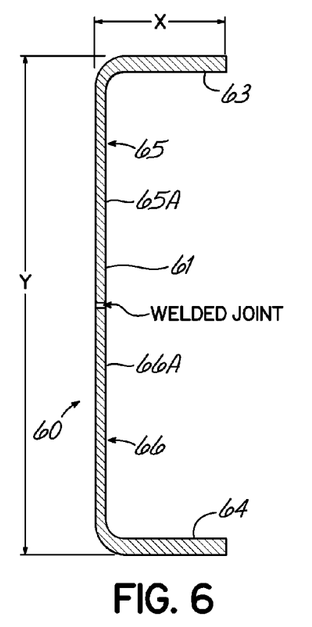
FIG. 6 is an alternate cross-section of a welded hot-rolled high-strength steel structure.

In this Example, another structural member 60 of this invention is shown in FIG. 6 with the same hot-rolled steel properties and composition of Example 2. In this Example, structural member 60 is fabricated in the same fashion as the structural member 20 of Example 2 by hot-rolling the first and second structural units 65, 66, each having web precursor portions 65A and 66A, respectively, extending from first and second flange precursor portions 63 and 64. The first structural unit 65 is welded to the second structural unit 66 to form a welded web portion 61 having an elongated Welded Joint along the length of the elongated structural member 60 between the first and second flange portions 63, 64 opposed and extending from opposite ends of the welded web portion 61. The web portion 61 has an average thickness less than the average thickness of either thickness of flanges 63 and 64. The web thickness of Comparative Example 1 is reduced by 25% and the upper and lower flange thicknesses 63, 64 are increased. The whole web 61 thickness is reduced from 6.8 mm to 5.1 mm (0.201"). The flange thicknesses 63, 64 are increased to 7.9 mm (0.311"), whereby a weight saving of 11% (18 kgs, 40 lbs) without a strength compromise is achieved. The advantages of this structure offer a significant weight saving without a strength compromise. Again, strength is defined as the section modulus of the cross section about the horizontal axis through the centroid at its farthest bottom part from the horizontal axis through the centroid, according to the following calculations:

Area=2.32e+003 millimeter^2

Centroid relative to output coordinate system origin: (millimeters)
X=−18
Y=135
Z=0
Moments of inertia of the area, at the centroid: (millimeters ^4)
Lxx=2.46e+007 Lxy=1.95e−008 Lxz=0
Lyx=1.95e−008 Lyy=1.06e+006 Lyz=0
Lzx=0 Lzy=0 Lzz=2.56e+007
X is horizontal. Y is vertical.
No strength compromise is shown by the calculation for comparative section modulus (ΔSM):

$$\Delta SM = \frac{2.46 - 2.46}{2.46} \times 100\% = 0\%$$

Example 7

Figure 7:
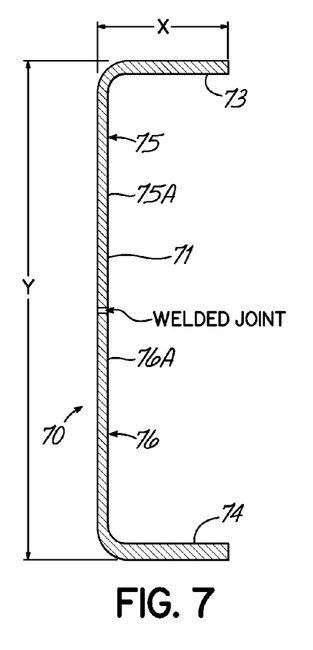
FIG. 7 is an alternate cross-section of a welded hot-rolled high-strength steel structure.

In this Example, another structural member 70 of this invention is shown in FIG. 7 with the same hot-rolled steel properties and composition of Example 2. In this Example, structural member 70 is fabricated in the same fashion as the structural member 20 of Example 2 by hot-rolling the first and second structural units 75, 76, each having web precursor portions 75A and 76A, respectively, extending from first and second flange precursor portions 73 and 74. The first structural unit 75 is welded to the second structural unit 76 to form a welded web portion 71 having an elongated Welded Joint along the length of the elongated structural member 70 between opposed first and second flange portions 73, 74 and extending from opposite ends of the welded web portion 71. The web portion 71 has an average thickness less than the average thickness of the thickness of either flange 73 and 74. The web thickness of the Comparative Example 1 is reduced by 25%, and the lower flange thickness is increased. The whole web 71 thickness is reduced to 5.1 mm (0.201") and only the lower flange 74 thickness is increased to 8.2 mm (0.323"), thereby offering a weight saving of 13% (22 kgs, 49 lbs) essentially without a strength compromise. Again, strength is defined as the section modulus of the cross section about the horizontal axis through the centroid at its farthest bottom part from the horizontal axis through the centroid, according to the following calculations:

Area=2.27e+003 millimeters^2

Centroid relative to output coordinate system origin: (millimeters)
X=−17.6
Y=130
Z=0
Moments of inertia of the area, at the centroid: (millimeters ^4)
Lxx=2.37e+007 Lxy=−2.32e+005 Lxz=0
Lyx=2.32e+005 Lyy=1.02e+006 Lyz=0
Lzx=0 Lzy=0 Lzz=2.47e+007
X is horizontal. Y is vertical.
No strength compromise is shown by the calculation for comparative section modulus (ΔSM).

$$\Delta SM = \frac{2.46 - \left(2.37 \times \frac{135}{130}\right)}{2.46} \times 100\% = 0\%$$

The following is a Summary Table of Examples 1-7.

| | Web Thickness | | Top Flange Thickness | | Bottom Flange Thickness | | Weight Saving Baseline: 167 kg (371 lbs) | | | Strength Compromise |
|---|---|---|---|---|---|---|---|---|---|---|
| | mm | inch | mm | inch | mm | inch | % | kg | lb | % |
| Comparative Example 1 | 6.8 | 0.26 | 6.8 | 0.268 | 6.8 | 0.268 | N/A | N/A | N/A | N/A |
| Option 1: Web Thickness is Reduced 50%. | | | | | | | | | | |
| Example 2 | 3.4 | 0.134 | 6.8 | 0.268 | 6.8 | 0.268 | 33% | 55 | 122 | 19% |
| Example 3 | 3.4 | 0.134 | 9.0 | 0.354 | 9.0 | 0.354 | 22% | 37 | 82 | 0% |
| Example 4 | 3.4 | 0.134 | 6.8 | 0.268 | 9.5 | 0.374 | 26% | 43 | 96 | 0% |
| Option 2: Web Thickness is Reduced 25%. | | | | | | | | | | |
| Example 5 | 5.1 | 0.201 | 6.8 | 0.268 | 6.8 | 0.268 | 17% | 28 | 62 | 10% |
| Example 6 | 5.1 | 0.201 | 7.9 | 0.311 | 7.9 | 0.311 | 11% | 18 | 40 | 0% |
| Example 7 | 5.1 | 0.201 | 6.8 | 0.268 | 8.2 | 0.268 | 13% | 22 | 49 | 0% |

Example 8

Figure 8:
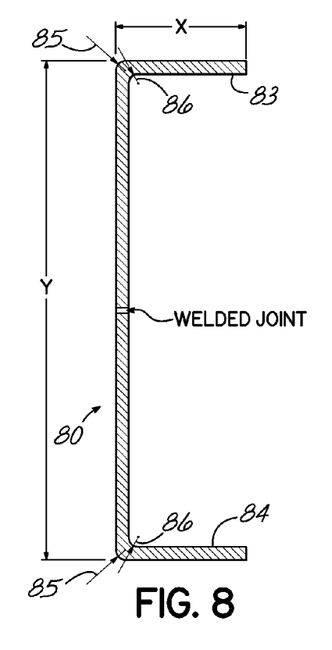
FIG. 8 is an alternate cross-section of a welded hot-rolled high-strength steel structure.

With reference to the Examples 2-7, the corner radii at the intersection of each flange and web portion form a round corner. Larger or smaller inner and outer radii can be rolled to meet different design and assembly requirements. In this Example, as shown in FIG. 8, both inner and outer radii 86, 85 of flanges 83, 84 are reduced to 5 mm (0.197") and 11.8 mm (0.465"), respectively for the structural member 80. A 3% weight increase (5 kgs, 11 lbs) with a strength increase of 5% is achieved. Again, strength is defined as the section modulus of the cross section about the horizontal axis through the centroid at its farthest bottom part from the horizontal axis through the centroid, according to the following calculations:

Area=2.7$e$+003 millimeters^2

Centroid relative to output coordinate system origin: (millimeters)
X=−14.6
Y=135
Z=0
Moments of inertia of the area, at the centroid: (millimeters ^4)
Lxx=2.6e+007 Lxy=4.15e−008 Lxz=0
Lyx=4.15e−008 Lyy=1.01e+006 Lyz=0
Lzx=0 Lzy 0 Lzz 2.7e+007
X is horizontal. Y is vertical.
Strength increase is shown by the comparative calculation of section modulus (ΔSM).

$$\Delta SM = \frac{2.46 - 2.6}{2.46} \times 100\% = -5\%$$

Example 9

Figure 9A:
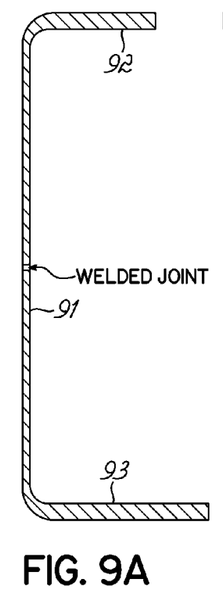
FIGS. 9A-9E are cross-sections of other alternate welded hot-rolled high-strength steel structures.
Figures 9B, 9C:
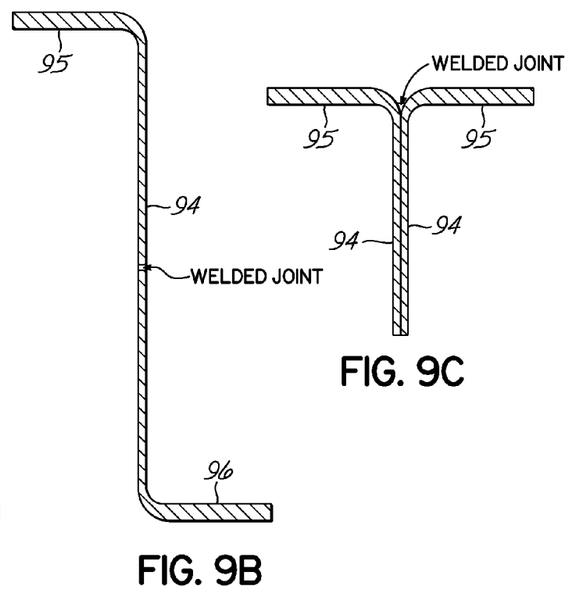
Figure 9D:
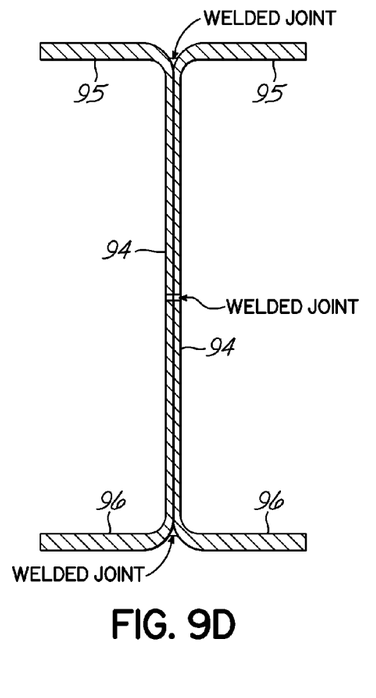
Figure 9E:
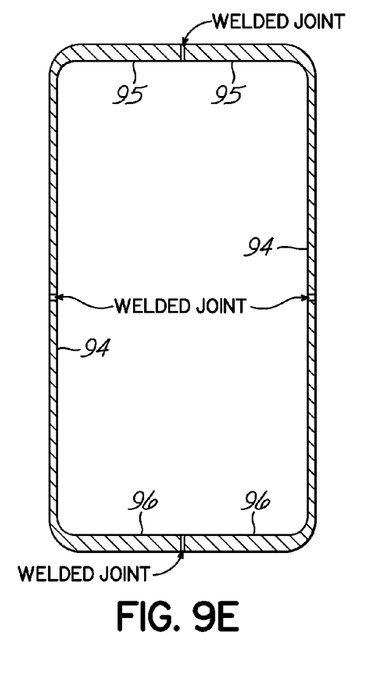

With reference to FIGS. 9A-9E, this Example demonstrates the design flexibility achieved by the welded structural members of this invention. In a manner similar to the foregoing Examples 1-7, first and second structural units are hot-rolled with precursor web and flange portions and welded to form an elongated "Welded Joint" as shown in FIGS. 9A-9E between the structural units. An elongated structural member having a set cross-sectional configuration with first upper and second lower flange portions 92, 93, opposed and extending from opposite ends of a thinner web portion 91 is shown by FIG. 9A in the form of a C-beam. The FIG. 9A C-beam structure has an average web thickness not less than about 35% and not more than about 85% of the average thickness of the thicknesses of flanges 92, 93 to achieve a weight saving with minor or no loss of strength. FIG. 9A also shows that flange 93 has a cross-sectional length which is longer than flange 92 to demonstrate the inventive feature of design flexibility to aid in different assembly combinations for the structural members. The Z-beam of FIG. 9B offers the same weight saving advantages and minor or no loss of strength with welded thin web 94 and flanges 95, 96. Similarly, in FIGS. 9C, 9D, and 9E, the T-beam, I-beam and rectangular beam structures are shown with thinner web portions 94 and thicker flanges portions 95, 96, to achieve the benefits of weight saving with minor or no significant loss in strength. The design flexibility examples of FIGS. 9A-9E support the various cross-sectional configurations of the hot-rolled high-strength steel structural members of this invention consisting of L, C, Z, T, I, U and rectangular shapes.

In summary, this invention provides for hot-rolled high-strength structural members such as those employed in truck frame rails and the method of their production. The method does not require heat treatments as employed in other methods. Significant weight saving with or without strength compromise is achieved according to the principles of this invention. Furthermore, standard hole pattern changes may be employed with rails for truck frames as typically found in the art. The invention offers greater design flexibility with differing corner radii, different assembly combinations, and asymmetrical designs with significant reduction in weight and costs, and quality improvement.

The scope of this invention is not intended to be limited by the Examples provided herein, but rather is defined by the appended claims.

What is claimed is:

1. A welded high-strength steel structural member comprising
a welded hot-rolled high-strength steel elongated structural member having a tensile strength of at least about 120,000 psi and a yield strength of at least about 90,000 psi having a length and a uniform cross-sectional configuration formed by welding a first separate structural unit to a second separate structural unit, the first unit having a web portion and a first flange portion, the second unit having a web portion and second flange portion, each unit having a length and an L-shaped cross-section along the complete unit length, the welded uniform cross-sectional configuration comprising a welded continuous web portion connecting said first and second flange portions each having an average thickness and extending at about a 90° angle from opposite ends of said welded web portion, each said first and second flange portion intersects the web portion to form a corner having inner and outer radii, said welded web portion having an average thickness less than the average thickness of said first and second flange portions, wherein the weld joins said web portions of said first and second structural units together and completely extends along the length of the uniform cross-sectional configuration of said welded structural member between said first and second flange portions at a neutral axis of said member, said welded continuous web portion thickness providing weight savings in said welded structural member with essentially no strength compromise uniformly along the member length as shown by the calculation for comparative section modulus (ΔSM) of said welded structural member when compared to a baseline structural member with a web portion and extending flanges having the same thickness, said first and second flange portions providing with the welded web portion load bearing capacity to said welded structural member.

2. The welded high-strength structural steel member of claim 1 where the composition of the high-strength steel comprises, by weight percent, carbon, about 0.30% to about 0.65% manganese, about 0.30% to about 2.5% at least one of the group consisting of aluminum, niobium, titanium, and vanadium, and mixtures thereof, about 0.03% to about 0.35%, and iron and production impurities, the balance.

3. The welded high-strength structural member of claim 1 wherein said uniform cross-sectional configuration is selected from the group consisting of O, L, C, Z, I, T, U and rectangular shapes.

4. The welded high-strength steel structural member of claim 1 wherein the average thickness of said welded continuous web portion is about 35% to about 85% of the average thickness of said first and second flange portions and the average thickness of the second flange portion is different than the average thickness of the first flange portion.

5. A truck frame rail comprising the welded high-strength steel structural member of claim 1.

6. The truck frame rail of claim 5 wherein the average thickness of said welded continuous web portion is about 35% to about 85% of the average thickness of said first and second flange portions.

7. The truck frame rail of claim 5 wherein said uniform cross-sectional configuration has a C-shape.

8. The welded high-strength steel structural member of claim 1 wherein the average thickness of said welded continuous web portion is not less than about 35% and not more than about 85% of the average thickness of said first and second flange portions.

9. The welded high-strength steel structural member of claim 1 wherein said first and second flange portions of the uniform cross-sectional configuration have approximately the same average thickness.

10. The welded high-strength steel structural member of claim 1 wherein the average thickness of the first flange portion is different than the average thickness of the second flange portion.

11. The welded high-strength steel structural member of claim 1 wherein the uniform cross-sectional length of the first flange portion is different than the cross-sectional length of the second flange portion.

12. The welded high-strength steel structural member of claim 1 wherein the average thickness of the welded continuous web portion is about 35% to about 85% of the average thickness of said first and second flange portions, said first and second flange portions having approximately the same average thickness.

\* \* \* \* \*